US012499794B2

(12) United States Patent
Qi et al.

(10) Patent No.: US 12,499,794 B2
(45) Date of Patent: Dec. 16, 2025

(54) MEDIA DATA ENCRYPTION, AND MEDIA DATA PLAYBACK

(71) Applicant: UNILUMIN GROUP CO., LTD., Guangdong (CN)

(72) Inventors: Feng Qi, Guangdong (CN); Chengzhi Yu, Guangdong (CN)

(73) Assignee: UNILUMIN GROUP CO., LTD., Shenzhen (CN)

( * ) Notice: Subject to any disclaimer, the term of this patent is extended or adjusted under 35 U.S.C. 154(b) by 0 days.

(21) Appl. No.: 18/633,023

(22) Filed: Apr. 11, 2024

(65) Prior Publication Data

US 2024/0257681 A1    Aug. 1, 2024

Related U.S. Application Data

(63) Continuation of application No. PCT/CN2022/109017, filed on Jul. 29, 2022.

(30) Foreign Application Priority Data

Dec. 10, 2021 (CN) .......................... 202111508977.0
Dec. 10, 2021 (CN) .......................... 202111510830.5

(51) Int. Cl.
*G06F 21/60* (2013.01)
*G06F 21/64* (2013.01)
*G09G 3/00* (2006.01)

(52) U.S. Cl.
CPC ........... *G09G 3/007* (2013.01); *G06F 21/602* (2013.01); *G06F 21/64* (2013.01)

(58) Field of Classification Search
CPC ............................... G06F 21/602; G06F 21/64
(Continued)

(56) References Cited

U.S. PATENT DOCUMENTS

| 8,739,308 B1* | 5/2014 | Roth | G06F 21/60 |
| | | | 726/32 |
| 8,837,598 B2* | 9/2014 | McFarland | H04N 21/63345 |
| | | | 380/37 |

(Continued)

FOREIGN PATENT DOCUMENTS

| CN | 106782293 A | 5/2017 |
| CN | 110248045 A | 9/2019 |

(Continued)

OTHER PUBLICATIONS

International Search Report in International application No. PCT/CN2022/109017, mailed on Oct. 14, 2022.

(Continued)

*Primary Examiner* — Samson B Lemma
(74) *Attorney, Agent, or Firm* — PV IP PC; We Te Chung

(57) ABSTRACT

A method of encrypting media data includes: obtaining the media data and one or more structure parameters of a display screen of a data playback device; constructing a data arrangement table based on the structure parameters; performing a data rearrangement operation on the data arrangement table to obtain position rearrangement index data, where the position rearrangement index data represents a mapping relationship between a logical position of each of pixels of the display screen and a physical position of the each of pixels; and performing pixel rearrangement encryption on each of one or more image frames of the media data based on the position rearrangement index data, to obtain encrypted media data.

12 Claims, 9 Drawing Sheets

(58) Field of Classification Search
USPC .......................................................... 380/200
See application file for complete search history.

(56) References Cited

U.S. PATENT DOCUMENTS

| | | | | |
|---|---|---|---|---|
| 8,971,531 | B2 * | 3/2015 | Amirtharajan | ........... H04K 1/06 380/54 |
| 2006/0285721 | A1 * | 12/2006 | Hsieh | ................. H04N 1/32325 382/100 |
| 2010/0169649 | A1 * | 7/2010 | Haas | ..................... H04N 1/0084 380/246 |
| 2021/0193183 | A1 * | 6/2021 | Maurice | ............... G11B 27/031 |

FOREIGN PATENT DOCUMENTS

| | | | |
|---|---|---|---|
| CN | 111461952 | A | 7/2020 |
| CN | 114186255 | A | 3/2022 |
| CN | 114286116 | A | 4/2022 |
| CN | 114337988 | A | 4/2022 |
| EP | 2119232 | B1 * | 11/2014 ........... H04N 7/1675 |

OTHER PUBLICATIONS

Written Opinion of the International Search Authority in International application No. PCT/CN2022/109017, mailed on Oct. 14, 2022.

* cited by examiner

|   | Column |   |   |   |
|---|---|---|---|---|
| Row | 0 | 1 | 2 | 3 |
| 0 | 1 | 2 | 3 | 4 |
| 1 | 5 | 6 | 7 | 8 |
| 2 | 9 | 10 | 11 | 12 |
| 3 | 13 | 14 | 15 | 16 |

4*4 sequential arrangement display pixels

|   | Column |   |   |   |
|---|---|---|---|---|
| Row | 0 | 1 | 2 | 3 |
| 0 | 4 | 8 | 11 | 2 |
| 1 | 16 | 15 | 5 | 7 |
| 2 | 13 | 1 | 12 | 14 |
| 3 | 10 | 6 | 9 | 3 |

4*4 rearrangement display pixels

|   | Column |   |   |   |
|---|---|---|---|---|
| Row | 0 | 1 | 2 | 3 |
| 0 | 2,1 | 0,3 | 3,3 | 0,0 |
| 1 | 1,2 | 3,1 | 1,3 | 0,1 |
| 2 | 3,2 | 3,0 | 0,2 | 2,2 |
| 3 | 2,0 | 2,3 | 1,1 | 1,0 |

Position rearrangement index table

FIG. 3

MEDIA DATA ENCRYPTION, AND MEDIA DATA PLAYBACK

CROSS REFERENCE TO RELATED APPLICATIONS

This application is a continuation of International Application No. PCT/CN2022/109017, filed on Jul. 29, 2022, which claims priority to Chinese Patent Application No. 202111508977.0, filed on Dec. 10, 2021, and priority to Chinese Patent Application No. 202111510830.5, filed on Dec. 10, 2021. The disclosures of the abovementioned applications are incorporated herein by reference in their entireties.

TECHNICAL FIELD

The present disclosure relates to information security technologies, and more particularly to media data, a computer device, and a storage medium, as well as a method and a system for playing media data.

BACKGROUND

With rapid development of the light-emitting diode (LED) display screen industry, an application field of the display screen is becoming wider and wider. The display screen, as an important way of media carrier, is increasingly recognized by the market. With further development of construction of an intelligent city, the display screen is more intelligent and convenient, and can be remotely controlled via a network. The technology development brings convenience to a manager for a large display screen, but also brings certain information security risks. The security of content displayed on the LED display screen as a public communication medium is one of important considerations for the security of the LED display screen.

However, in a conventional media data playback mode, generally media information is encrypted using a common encryption algorithm, playback control is performed in conjunction with different authentication modes, and the display screen subsystem still maintains an original point-to-point mapping mode. As such, after an underlying operating system of the playback control device is hacked or controlled, media data may be projected to the display screen in a hardware mapping mode regardless of whether the media data is authorized or not.

Thus, there is a need for a solution capable of enhancing privacy of media data and ensuring proper playback of the media data.

SUMMARY

According to one or more embodiments of the present disclosure, a method of encrypting media data includes:
   obtaining media data to be encrypted and one or more structure parameters of a display screen of a data playback device;
   constructing a data arrangement table corresponding to the structure parameters;
   performing a data rearrangement operation on the data arrangement table to obtain position rearrangement index data, where the position rearrangement index data represents a mapping relationship between a logical position and a physical position of each of display pixels; and
   performing pixel rearrangement encryption on each of one or more image frame of the media data according to the position rearrangement index data to obtain encrypted media data.

According to one or more embodiments of the present disclosure, a method of playing media data includes:
   a data encryption device encoding and encrypting media data to be encrypted by the method of encrypting the media data described above to obtain the encrypted media data, merging the encrypted media data, position rearrangement index data, and a preset check code to obtain a media data encryption package, and transmitting the media data encryption package to a data playback device; and
   a receiving card of the data playback device decrypting the media data encryption package to obtain configuration data and the encrypted media data, configuring a programmable logic circuit according to the configuration data, decrypting the encrypted media data according to the configured programmable logic circuit to obtain decrypted media data, and playing the decrypted media data;
   where the configuration data includes the position rearrangement index data and the preset check code.

According to one or more embodiments of the present disclosure, an apparatus of encrypting media data includes:
   a data obtaining module for obtaining the media data to be encrypted and one or more structure parameters of a display screen of a data playback device;
   a data arrangement table constructing module for constructing module for constructing a data arrangement table corresponding to the structure parameters;
   an index data obtaining module for performing a data rearrangement operation on the data arrangement table to obtain position rearrangement index data, wherein the position rearrangement index data represents a mapping relationship between a logical position and a physical position of each of display pixels; and
   a data encrypting module for performing pixel rearrangement encryption on each of one or more image frames of the media data based on the position rearrangement index data, to obtain encrypted media data.

According to one or more embodiments of the present disclosure, a computer device includes: a memory and one or more processors, where the memory has stored therein computer readable instructions that, when executed by the processors, cause the one or more processors to perform operations including:
   obtaining the media data to be encrypted and one or more structure parameters of a display screen of a data playback device;
   constructing a data arrangement table corresponding to the structure parameters;
   performing a data rearrangement operation on the data arrangement table to obtain position rearrangement index data, wherein the position rearrangement index data represents a mapping relationship between a logical position and a physical position of each of display pixels; and
   performing pixel rearrangement encryption on each of one or more image frames of the media data based on the position rearrangement index data, to obtain encrypted media data.

According to one or more embodiments of the present disclosure, a non-transitory computer readable storage medium having stored computer instructions thereon that, when executed by one or more processors, cause the one or more processors to perform operations including:

obtaining media data to be encrypted and one or more structure parameters of a display screen of a data playback device;

constructing a data arrangement table corresponding to the structure parameters;

performing a data rearrangement operation on the data arrangement table to obtain position rearrangement index data, wherein the position rearrangement index data represents a mapping relationship between a logical position and a physical position of each of display pixels; and performing pixel rearrangement encryption on each of one or more image frames of the media data based on the position rearrangement index data, to obtain encrypted media data.

According to one or more embodiments of the present disclosure, a system for playing media data includes: a data encryption device and a data playback device communicating with each other over a network;

where the data encryption device encodes and encrypts media data to be encrypted by the method of encrypting the media data described above to obtain the encrypted media data; merge the encrypted media data, the position rearrangement index data and a preset check code to obtain a media data encryption package; and transmit the media data encryption package to the data playback device; and where a receiving card of the data playback device is configured to decrypt the media data encryption package to obtain configuration data and the encrypted media data, configure a programmable logic circuit based on the configuration data, and decrypt the encrypted media data based on the configured programmable logic circuit to obtain decrypted media data; and play the decrypted media data; and where the configuration data includes the position rearrangement index data and the preset check code.

BRIEF DESCRIPTION OF THE DRAWINGS

FIG. 3 schematically illustrates a process of obtaining a pixel position rearrangement index table according to some embodiments of the present disclosure.

DETAILED DESCRIPTION

Some embodiments of the present disclosure will be described in detail below with reference to the accompanying drawings. The embodiments are described for illustrative purposes only and are not intended to limit the present disclosure.

Figure 1:
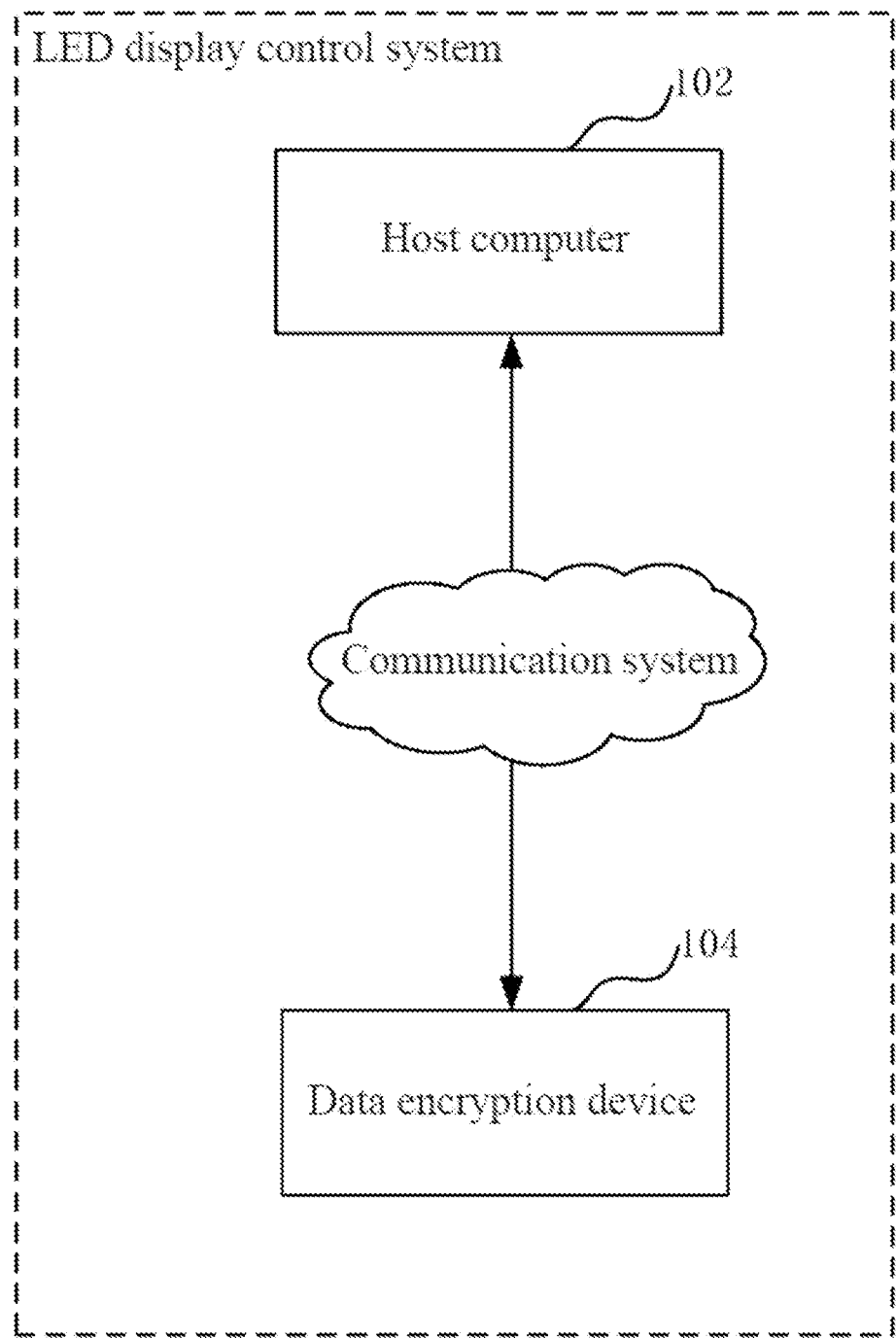
FIG. 1 illustrates a scenario where a method of encrypting media data according to some embodiments of the present disclosure can be applied.

A method of encrypting media data provided in the present disclosure can be applied to an application environment as shown in FIG. 1. A host computer 102 may be communicated with a data encryption device 104 over a network in an LED display control system. Specifically, the host computer 102 may upload media data to be encrypted (such as a video source file) and one or more structure parameters of a display screen of a data playback device to the data encryption device 104 in advance, and then transmit a media data encryption message to the data encryption device 104. Alternatively, the host computer 102 may transmit a media data encryption message carrying media data to be encrypted and one or more structure parameters of a display screen of a data playback device to the data encryption device 104. The data encryption device 104 may obtain the media data and the structure parameters of the display screen in response to the media data encryption message, construct a data arrangement table corresponding to the structure parameters, perform a data rearrangement operation on the data arrangement table to obtain position rearrangement index data, the position rearrangement index data representing a mapping relationship between a logical position and a physical position of each of display pixels, and perform pixel rearrangement encryption on each image frame of the media data to be encrypted according to the position rearrangement index data to obtain encrypted media data. The host computer 102 may be, but not limited to, one of various personal computers, notebook computers, smartphones, tablet computers, and portable wearable devices, and the data encryption device 104 may include, but be not limited to, an encryption encoding engine.

Figure 2:
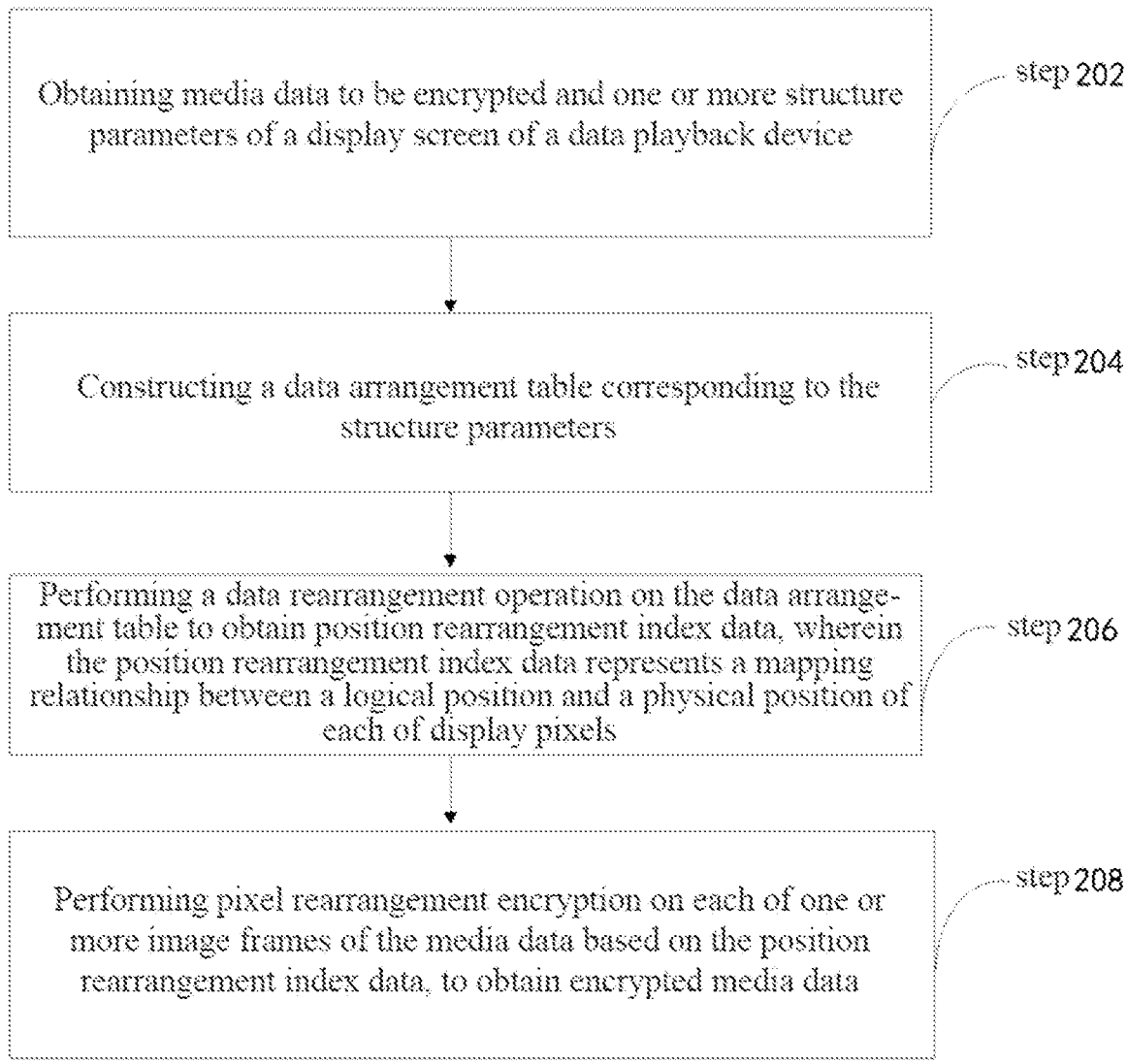
FIG. 2 is a schematic flow diagram of a method of encrypting media data according to some embodiments of the present disclosure.

In an embodiment of the present disclosure, a method of encrypting media data is provided as shown in FIG. 2, and will be described by applying the method to the data encryption device 104 of FIG. 1 as an example. In the embodiment of the present disclosure, the method may include following steps 202-208.

At the step 202, media data to be encrypted and one or more structure parameters of a display screen of a data playback device may be obtained.

In the embodiment of the present disclosure, an example in which the media data to be encrypted is a video source to be encrypted and the display screen is an LED display screen may be taken for illustration, where the structure parameters of the display screen may include: a dimension of the LED display screen, one or more constituent elements of the LED display screen, and a lattice scale of each of the constituent elements, and the like. Specifically, a screen of one display screen is composed of a plurality of cabinets, each of the cabinets is composed of a plurality of modules, and each of the modules may be a 32*32 lattice module, a 64*64 lattice module, or the like. In a practical application, video data to be encrypted and the structure parameters of the display screen of a data playback device for the video data may be imported by a worker, and a data encryption instruction may be transmitted by performing an operation on an operation interface to encrypt the media data.

At the step 204, a data arrangement table corresponding to the structure parameters may be constructed.

The data arrangement table may be understood as a matrix, a table, or a model. The data arrangement table may include at least one of: a logical relationship table between each of display pixels and a drive circuit for the display pixel, a relative relationship table between each of display modules and output data of a receiving card, or a connection relationship table between each of cabinets and corresponding one of display units. After the structure parameters of the LED display screen are obtained, a matrix proportional to a lattice scale of each of constituent elements of the display screen may be constructed according to the lattice scale. For example, if the lattice scale is a 32*32 module, then a 32*32 data arrangement table (matrix) may be constructed, correspondingly. It should be understood that, if an actual position of each of pixels may be described in a data arrangement table of an N*N lattice scale in each of various LED control systems in a manner of similar "dotting", then there can be up to (N*N)! combinations of different arrangement sequences.

At the step 206, a data rearrangement operation may be performed on the data arrangement table to obtain position rearrangement index data, where the position rearrangement index data represents a mapping relationship between a logical position and a physical position of each of pixels of the display screen.

The position rearrangement index data may be a position rearrangement index table that has the same size as the data arrangement table, and a unit value in the position rearrangement index table refers to a position of an element of a sequential data arrangement table stored in a data rearrangement table. After the data arrangement table is constructed, a data rearrangement operation may be performed on the data arrangement table to obtain a data rearrangement table, and then the sequential data arrangement table is compared with the data rearrangement table to obtain the position rearrangement index data. As shown in FIG. 3, if a random rearrangement operation is performed on a 4*4 pixel arrangement table of (where different colors of the table represent different pixel information) to a pixel rearrangement table, the sequential pixel arrangement table is compared with the pixel rearrangement table to obtain a 4*4 position rearrangement index table (also referred to as a pixel position rearrangement index table). Similarly, it should be understood that, if the data rearrangement operation is performed on an 4*4 originally sequential data arrangement table, then there may be (4*4)!-1 arrangements (excluding a case of sequential arrangement), and thus (4*4)!-1 position rearrangement index tables can be obtained correspondingly. In the present embodiment of the present disclosure, the data rearrangement table may be restored to the originally sequential data arrangement table according to the position rearrangement index table. As such, in a subsequent image encrypting process, a rearranged image may be also restored to a sequential image according to the position rearrangement index table.

At the step 208, pixel rearrangement encryption may be performed on each image frame of the media data to be encrypted according to the position rearrangement index data to obtain encrypted media data.

After the position rearrangement index table is obtained, since the data arrangement table corresponds to the structure parameters of the LED display screen, pixel rearrangement encryption may be performed on images in video data to be displayed frame by frame according to the position rearrangement index table, that is, the position rearrangement index table is used as index for pixel rearrangement encryption, and a rearrangement operation is performed on the pixels to obtain encrypted video data having the rearranged pixels. In a practical application, since there are many forms for data arrangement in the position rearrangement index table, there are also many possible results for the video data having the rearranged pixels. If an attacker wants to restore the video data having the rearranged pixels to originally correct video data, it is necessary to attempt to approach infinity attempts, and the possibility of cracking the video data is minimal.

In the above-described method of encrypting media data, the data arrangement table associated with the one or more structure parameters of the display screen of the data playback device is first constructed, the data rearrangement operation is then performed on the data arrangement table to obtain position rearrangement index data, and finally, the pixel rearrangement encryption operation is performed on the media data to be encrypted according to the position rearrangement index data, so that there are many possibilities for the obtained encryption result. Since the position rearrangement index data represents a mapping relationship between a logical position and a physical position of each of pixels of the display screen, it is necessary to perform inverse rearrangement decoding to correctly decode and play the media data depending on real-time decoding capability of the receiving card of the data playback device. As such, even if an operating system of the data playback device is illegally controlled, since there are many possibilities for the obtained encryption result, the possibility of cracking the media data encryption package is minimal. Therefore, the inverse rearrangement decoding cannot be performed correctly, so that the media data cannot be displayed correctly, thereby improving the information security of the media data.

Figure 4:
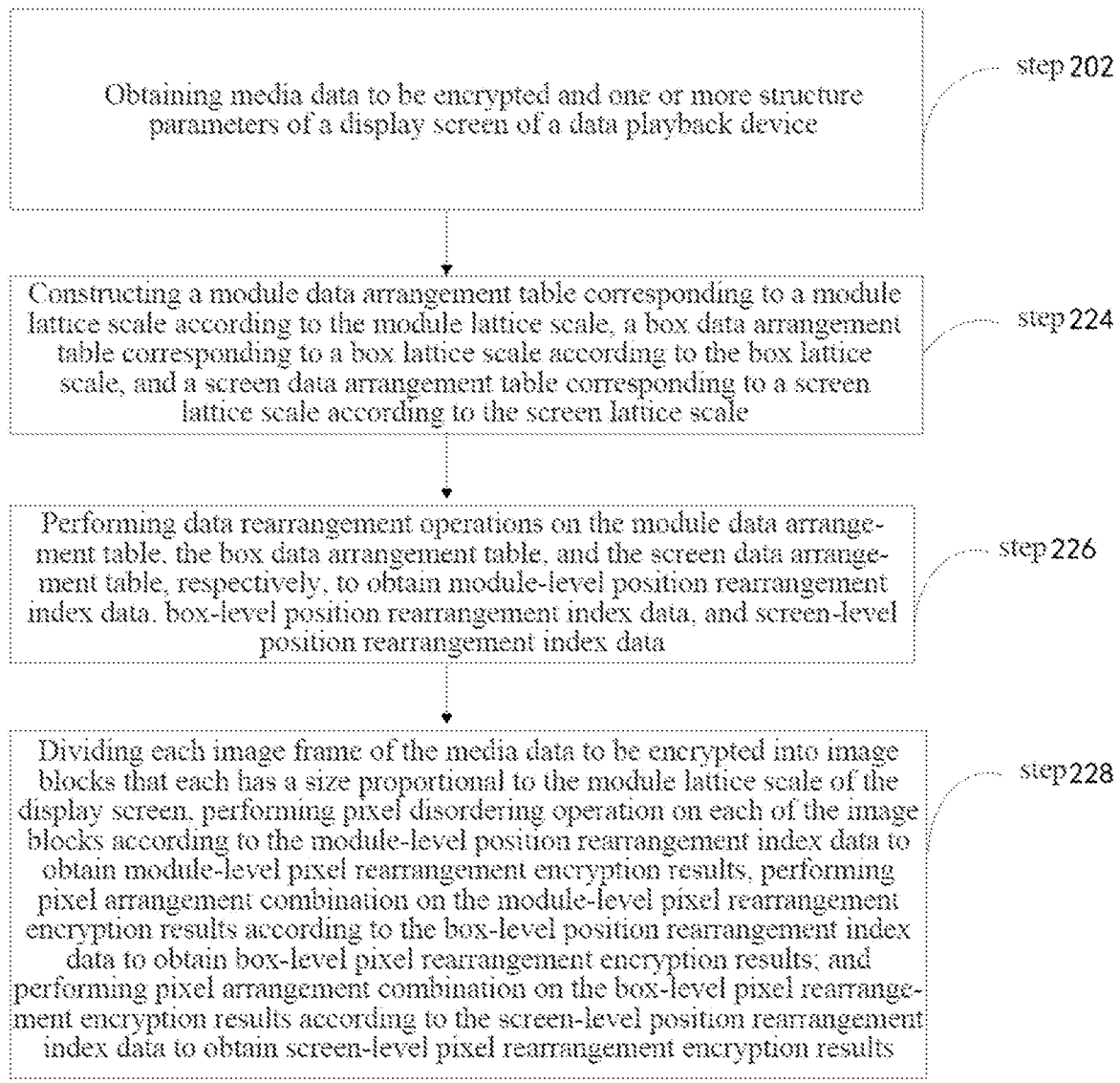
FIG. 4 is a schematic flow diagram of a method of encrypting media data according to some embodiments of the present disclosure.

As shown in FIG. 4, in an embodiment of the present disclosure, the structure parameters of the display screen include a module lattice scale, a cabinet lattice scale, and a screen lattice scale. The step 204 includes: step 224 of constructing a module data arrangement table corresponding to a module lattice scale according to the module lattice scale, a cabinet data arrangement table corresponding to a cabinet lattice scale according to the cabinet lattice scale, and a screen data arrangement table corresponding to a screen lattice scale according to the screen lattice scale.

In the embodiment, the structure parameters of the display screen include an LED module lattice scale, an LED cabinet lattice scale, and an LED screen lattice scale. After the LED module lattice scale, the LED cabinet lattice scale, and the LED screen lattice scale of the display screen are obtained, the module data arrangement table, the cabinet data arrangement table, and the screen data arrangement table corresponding to the module lattice scale, the cabinet lattice scale, and the screen lattice scale in the structure parameters of the display screen are respectively constructed according to the lattice scales. If an embodiment in which 96*96 cabinets composed of common 32*32 lattice modules is installed as a full-screen LED display screen with a horizontal length of 4 m*a height of 3 m is taken, then data abstraction modeling may be performed on the module, the cabinet and the screen, respectively, by illustratively taking a 32*32 matrix, a 3*3 matrix, and a 4*3 matrix, to obtain a module model with a 32*32 lattice scale (i.e., a 32*32 module data arrangement table), a cabinet model with a 3*3 lattice scale (i.e., a 3*3 cabinet data arrangement table), and a screen model with a 4*3 lattice scale (i.e., a 4*3 screen data arrangement table). The 4*3 screen model represents that a screen is composed of 12 cabinets, and the 3*3 cabinet model represents that a cabinet is composed of 9 modules. In particular, the module model, the cabinet model, and the screen model in the LED display system may be obtained by a pixel dotting table, a cabinet data arrangement table, and a cabinet connection diagram. The pixel dotting table includes a logical relationship between each of LED display pixel and a drive circuit, the cabinet data arrangement table includes a relative relationship between each of modules and the output data of the receiving card, and the cabinet connection diagram includes a connection relationship between each of cabinets and corresponding one of display units. It should be understood that if an actual position of each of elements (corresponding to pixels) can be described in the corresponding 32*32 module model in each of various LED control systems in a manner of similar "dotting", then the 32*32 module model may have at most (32*32) !=5.4185e+2639 combinations of different sequential arrangements. Considering that there is still a scanning circuit structure, even if quarter-scanned 32*32 module model is performed, there may be (32*32/4) !*4=3.4312e+507 results, that is, for each quarter-scanned 32*32 module model, there may be 3.4312e+507 combinations of different sequential arrangements. For the 3*3 cabinet model, if actual positions of nine modules therein are described, there may be (3*3) !=362880 combinations of different sequential arrangements. For the 4*3 screen model, if actual positions of 12 cabinets therein are described, there may be (4*3!)=479001600 combinations of different sequential arrangements. The above-described three models constitute, from bottom to top, possibilities of pixel arrangement combinations of LED display systems corresponding to the models, and the number of the combinations is a number close to infinity: (5.4185e+2639)*(3.4312e+507)*362880*479001600.

In the embodiment, encryption processing of the video data can be realized hierarchically by hierarchically constructing a module data arrangement table, a cabinet data arrangement table, and a screen data arrangement table corresponding to a module lattice scale, a cabinet lattice scale, and a screen lattice scale according to the module lattice scale, the cabinet lattice scale, and the screen lattice scale.

As shown in FIG. 4, in an embodiment of the present disclosure, the data arrangement table includes a module data arrangement table, a cabinet data arrangement table, and a screen data arrangement table. The step 206 includes: step 226 of performing data rearrangement operations on the module data arrangement table, the cabinet data arrangement table, and the screen data arrangement table, respectively, to obtain module-level position rearrangement index data, cabinet-level position rearrangement index data, and screen-level position rearrangement index data.

After the module data arrangement table, the cabinet data arrangement table, and the screen data arrangement table are constructed, the data rearrangement operations may be performed on the module data arrangement table, the cabinet data arrangement table, and the screen data arrangement table, respectively, to obtain a module data rearrangement table, a cabinet data rearrangement table, and a screen data rearrangement table, and then a sequential module data arrangement table, a sequential module cabinet data arrangement table, and a sequential screen data arrangement table, and the sequential module data arrangement table, the sequential module cabinet data arrangement table, and the sequential screen data arrangement table are analyzed to obtain a module-level position rearrangement index table, a cabinet-level position rearrangement index table and a screen-level position rearrangement index table. In another embodiment, a shuffling algorithm, Fisher-Yates shuffle, may be used to perform rearrangement on the module data arrangement table, the cabinet data arrangement table, and the screen data arrangement table. A specific process of the rearrangement may be described by obtaining the module data arrangement table, the cabinet data arrangement table, and the screen data arrangement table in the form of an array, first selecting the last element from the end of the array, and exchanging the last element with an element at a random position of the array, and then randomly generating a position from positions other than the position of the last element already arranged to enable an element at the generated position to be exchanged with a penultimate element, until all of elements are exchanged. It should be understood in other embodiments that other rearrangement algorithms, such as random extraction algorithms, may be used to perform rearrangement on the module data arrangement table, the cabinet data arrangement table, and the screen data arrangement table. In the present embodiment, the shuffling algorithm is used to perform rearrangement on the module data arrangement table, the cabinet data arrangement table, and the screen data arrangement table, so that it is possible to ensure that the rearranged data are completely random, and the possibility of cracking an image is increased.

In an embodiment of the present disclosure, the step 208 includes: dividing each image frame of the media data to be encrypted into image blocks that each has a size proportional to the module lattice scale of the display screen, performing a pixel rearrangement operation on each of the image blocks according to the module-level position rearrangement index data to obtain module-level pixel rearrangement encryption results, collecting the module-level pixel rearrangement encryption results corresponding to each image frame of the media data to be encrypted to obtain the encrypted media data, and collecting the module-level pixel rearrangement encryption results corresponding to each image frame of the media data to be encrypted to obtain the encrypted media data.

In a specific implementation, pixel rearrangement encryption processing may be performed on the video data frame by frame. Specifically, frame-by-frame rearrangement encryption processing may be: cutting each image frame in the video data sequentially (from top to bottom and/or from left to right) into image blocks with a size of 32*32 points by using the 32*32 module-level position rearrangement index table to obtain a plurality of image blocks; then performing a pixel rearrangement operation on each of the image blocks according to the module-level position rearrangement index data to generate new rearranged image blocks and obtain module-level pixel rearrangement encryption results; and then collecting module-level pixel rearrangement encryption results corresponding to each image frame in the media data to be encrypted to obtain the encrypted media data, that is, obtaining the encrypted media data. Further, the module-level position rearrangement index table can be encrypted and stored. In the embodiment, the pixel rearrangement operation is performed on each of the image blocks according to the module-level position rearrangement index data, to generate the new rearranged image block and obtain the module-level pixel rearrangement encryption result. Therefore, there may be many possibilities for the encryption results of the media data, and the difficulty for decrypting the media data is increased.

In an embodiment of the present disclosure, the step 208 further includes: performing pixel arrangement combination on the module-level pixel rearrangement encryption result according to the cabinet-level position rearrangement index data to obtain cabinet-level pixel rearrangement encryption results, and collecting the cabinet-level pixel rearrangement encryption results corresponding to each image frame in the media data to be encrypted to obtain the encrypted media data.

Continuing the above embodiment, after the module-level pixel rearrangement encryption results are obtained, the pixel arrangement combination may be further performed on the module-level pixel rearrangement encryption results according to the cabinet-level position rearrangement index data to obtain cabinet-level pixel rearrangement encryption results, and then the cabinet-level pixel rearrangement encryption results corresponding to each image frame in the media data to be encrypted are collected to obtain the encrypted media data. As such, a plurality of possibilities of the encryption results of the media data may be further increased on the basis of the module-level pixel rearrangement encryption results to further enhance an encryption strength of the video data.

In an embodiment of the present disclosure, the step 208 further includes: performing pixel arrangement combination on the cabinet-level pixel rearrangement encryption result according to the screen-level position rearrangement index data to obtain screen-level pixel rearrangement encryption results, and collecting the screen-level pixel rearrangement encryption results corresponding to each image frame in the media data to be encrypted to obtain the encrypted media data.

Continuing the above embodiment, similarly, after the cabinet-level pixel rearrangement encryption results are obtained, the pixel arrangement combination may be further performed on the cabinet-level pixel rearrangement encryption results according to the screen-level position rearrangement index data to obtain screen-level pixel rearrangement encryption results, and the cabinet-level pixel rearrangement encryption results corresponding to each image frame in the media data to be encrypted is collected to obtain the encrypted media data. As such, a plurality of possibilities of the encryption results of the media data may be further increased on the basis of the cabinet-level pixel rearrangement encryption results, so that the possibilities of the encryption results of the video data may be close to be infinite, and the encryption strength of the video data is enhanced.

As shown in FIG. 4, in an embodiment of the present disclosure, the position rearrangement index data may include: module-level position rearrangement index data, cabinet-level position rearrangement index data, and screen-level position rearrangement index data.

The step 208 includes: step 228 of dividing each of image frames of the media data to be encrypted into image blocks each having a size proportional to the module lattice scale of the display screen, performing pixel rearrangement operation on each of the image blocks according to the module-level position rearrangement index data to obtain module-level pixel rearrangement encryption results, performing pixel arrangement combination on the module-level pixel rearrangement encryption results according to the cabinet-level position rearrangement index data to obtain cabinet-level pixel rearrangement encryption results; and performing pixel arrangement combination on the cabinet-level pixel rearrangement encryption results according to the screen-level position rearrangement index data to obtain screen-level pixel rearrangement encryption results.

In a specific implementation, pixel rearrangement encryption processing may be performed on the video data frame by frame. Specifically, frame-by-frame rearrangement encryption processing may be: cutting each image frame in the video data sequentially (from top to bottom and/or from left to right) into image blocks with a size of 32*32 pixels by using the 32*32 module-level position rearrangement index table to obtain a plurality of image blocks; then performing a pixel rearrangement operation on each of the image blocks to generate new rearranged image blocks, obtain module-level pixel rearrangement encryption results, and further encrypt and store the module-level position rearrangement index table; then performing arrangement combination on the module-level encryption results according to 3*3 cabinet-level position rearrangement index data to obtain cabinet-level encryption results, and similarly encrypt and store the cabinet-level position rearrangement index table; and finally, performing arrangement combination on the cabinet-level encryption results according to the 4*3 screen-level position rearrangement index table to obtain screen-level encryption result, and similarly, encrypt and store the screen-level position rearrangement index table, so that an encryption result obtained by single-image frame processing is encrypted and stored. According to the above processing, the encryption processing of the entire video data is completed frame by frame, the screen-level pixel rearrangement encryption results corresponding to each image frame are collected to obtain the encrypted video data, and then the encryption results are stored as a data file. In the embodiment, pixel rearrangement encryption is hierarchically performed on the video data according to the module-level position rearrangement index data, the cabinet-level position rearrangement index data, and the screen-level position rearrangement index data, so that the possibilities of the encrypted video data may be close to be infinite, thereby greatly improving the difficulty for decoding the video data.

For a clear description of the method of encrypting media data provided in the present disclosure, following description is made in connection with a specific embodiment applied to a data encryption device.

A worker intends to transmit a piece of video data to a video data playback device, and the video data playback device plays the video data on the LED screen with a horizontal length of 4 m*a height of 3 m in which the 96*96 cabinets composed of the 32*32 lattice modules is mounted. The worker imports video data to be encrypted and structure parameters of an LED display screen of the video data playback device, including a 32*32 lattice module, a 3*3 lattice cabinet, and a 4*3 lattice screen, in the data encryption device, and then transmits a data encryption instruction. A processor of the data encryption device responds to the data encryption instruction, correspondingly constructs a 32*32 module model (32*32 matrix), a 3*3 cabinet model (4*3 matrix) and a 4*3 screen model (4*3 matrix) according to the 32*32 lattice module, the 3*3 lattice cabinet, and the 4*3 lattice screen, and then performs a rearranged operation on the 32*32 module model, the 3*3 cabinet model and the 4*3 screen model according to the shuffling algorithm to obtain a rearranged module model, a rearranged cabinet model, and a rearranged screen model, and then analyzes the rearranged module model, the rearranged cabinet model and the rearranged screen model as well as a sequential module model, a sequential cabinet model, and a sequential screen model, to obtain a module-level position rearrangement index table, a cabinet-level position rearrangement index table, and a screen-level position rearrangement index table. Then, frame-by-frame rearrangement encryption processing may be: cutting each image frame in the video data sequentially (from top to bottom and/or from left to right) into image blocks with a size of 32*32 points by using the 32*32 module-level position rearrangement index table to obtain a plurality of image blocks; then performing a pixel rearrangement operation on each of the image blocks to generate new rearranged image blocks, obtain module-level pixel rearrangement encryption results, and further encrypt and store the module-level position rearrangement index table; then performing arrangement combination on the module-level encryption results according to 3*3 cabinet-level position rearrangement index data to obtain cabinet-level encryption results, and similarly encrypt and store the cabinet-level position rearrangement index table; and finally, performing arrangement combination on the cabinet-level encryption results according to the 4*3 screen-level position rearrangement index table to obtain screen-level encryption result, and similarly, encrypt and store the screen-level position rearrangement index table, so that an encryption result obtained by single-image frame processing is encrypted and stored. According to the above processing, the encryption processing of the entire video data is completed frame by frame, the screen-level pixel rearrangement encryption results corresponding to each image frame are collected to obtain the encrypted video data, and then the encryption results are stored as a data file.

Figure 5:
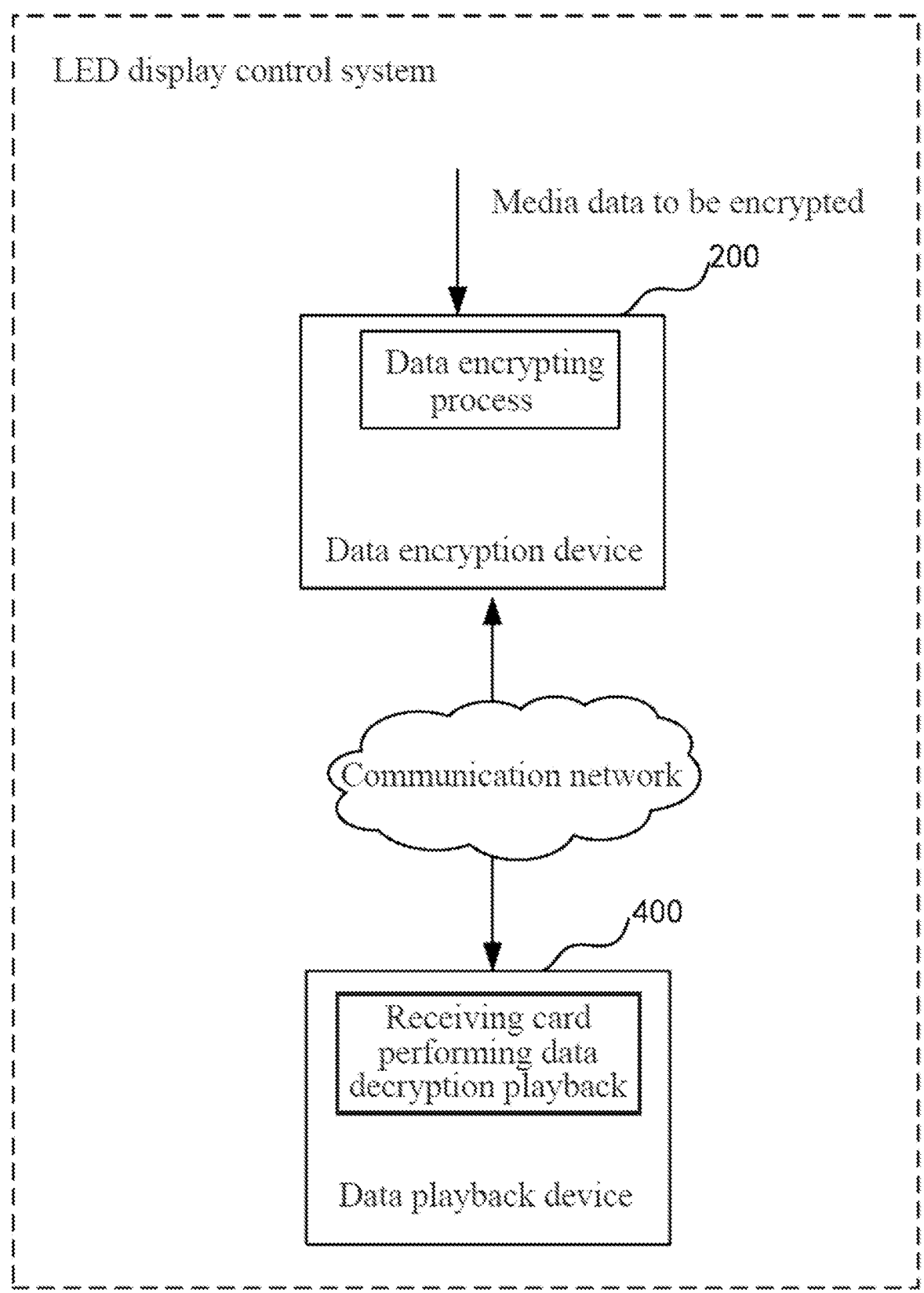
FIG. 5 illustrates a scenario where a method of playing media data according to some embodiments of the present disclosure can be applied.

A method of playing media data provided in an embodiment of the present disclosure can be applied to an application environment as shown in FIG. 5. A data encryption device 200 may be communicated with a data playback device 400 over a network in an LED display control system. Specifically, the data encryption device 200 may encode and encrypt the media data to be encrypted to obtain a media data encryption package, and the method of playing media data provided in the embodiments of the present disclosure may be applied to the application environment shown in FIG. 5. The data encryption device 200 may be communicated with the data playback device 400 over a network. Specifically, the data encryption device 200 may encode and encrypt the media data to be encrypted with the method of encrypting the media data of any one of the above embodiments to obtain the encrypted media data, merge the encrypted media data, position rearrangement index data, and a preset check code to obtain a media data encryption package, and transmit the media data encryption package to the data playback device 400. A receiving card of the data playback device 400 decrypts the media data encryption package to obtain configuration data and the media data to be decrypted, configures a programmable logic circuit according to the configuration data, and decrypts and plays the media data to be decrypted based on the configured programmable logic circuit, where the configuration data includes the position rearrangement index data and the preset check code, and transmits the media data encryption package to the data playback device 104. The data encryption device 102 includes, but is not limited to, an encryption coding engine dedicated to the LED display control system, and the data playback device 104 may be, but not limited to, a display terminal in the LED display control system.

Figure 6:
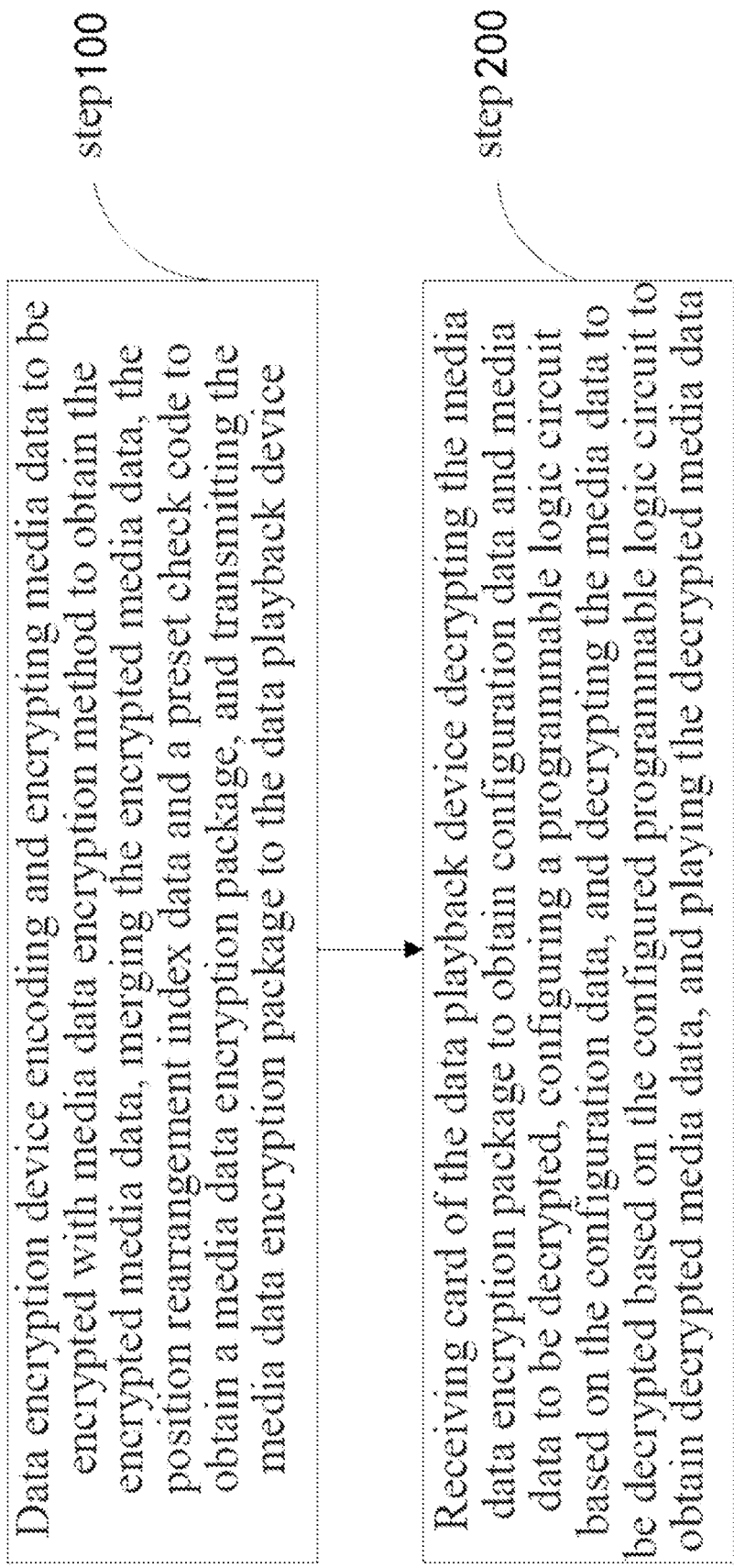
FIG. 6 is a schematic flow diagram of a method of playing media data according to some embodiments of the present disclosure.

As shown in FIG. 6, a method of playing media data is provided in an embodiment of the present disclosure, and an example in which the method is applied to the data encryption device and the data playback device in FIG. 1 is taken for illustration and the method includes following steps 100-200.

At step 100, the data encryption device encodes and encrypts media data to be encrypted by the method of encrypting the media data described above to obtain the encrypted media data, merges the encrypted media data, position rearrangement index data, and a preset check code to obtain a media data encryption package, and transmits the media data encryption package to the data playback device.

In the embodiment of the present disclosure, an example in which the media data to be encrypted is a video data to be encrypted and the display screen of the data playback device is an LED display screen may be taken for illustration, where the structure parameters of the display screen may include: a dimension of the LED display screen, one or more constituent elements of the LED display screen, and a lattice scale of each of the constituent elements, and the like. Specifically, a screen of one display screen is composed of a plurality of cabinets, each of the cabinets is composed of a plurality of modules, and each of the modules may be a 32*32 lattice module, a 64*64 lattice module, or the like. The position rearrangement index data may include: module-level position rearrangement index data, cabinet-level position rearrangement index data, and screen-level position rearrangement index data. In the embodiment, the data encryption device may perform encryption and encoding processing on the video data according to the method of encrypting media data to obtain the encrypted media data. A specific data encrypting process may refer to the embodiment of the above method of encrypting media data, which is not repeatedly described herein. Then, the data encryption device merges the encrypted media data, the position rearrangement index data, and the preset check code to obtain the media data encryption package, and transmits the media data encryption package to the data playback device. In the embodiment, the preset check code may be an MD5 code, where the MD5 code refers to a feature code generated by an MD5 Message-Digest algorithm. In another embodiment, to further enhance the transmission security of the encrypted video data, an MD5 operation may be performed on the encrypted video data to generate the MD5 check code, and then the module-level position rearrangement index data, the cabinet-level position rearrangement index data, and the screen-level position rearrangement index data, the encrypted video data, and the MD5 check code are packed together to obtain a media data encryption package. Since the possibility that the media data encryption package obtained by high-intensity encryption is cracked is minimal, the media data encryption package may be transmitted to the data playback device in any manner over a public network without the support of a technology such as VPN/Ipsec. At the same time, distribution of the media data may be further performed by using a Content Delivery Network (CDN) or a general broadband, without a fixed IP address and a fixed media service center, thereby greatly saving the investment and maintenance cost of an infrastructure. In a specific implementation, the media data encryption package may be transmitted to a target playing terminal over a content distribution network and/or a File Transfer Protocol (FTP). In the embodiment, by generating and transmitting the MD5 check code to the data playback device, the data playback device can perform MD5 check on the media data encryption package as well, and the media data can be further prevented from being tampered, thereby ensuring information security of the media data. Further, since the cost of a self-built network is extremely high, an existing large-scale distributed display network needs to connect each of display terminals to a media data center over a public network by leasing a dedicated line, a VPN, or the like, and a considerable bandwidth is required to ensure timely downloading of a media file, and its use cost is increased rapidly with the scarcity of IP addresses and the number of terminal nodes. In the present embodiment, by transmitting data over a public network, the cost of media transmission and distribution can be greatly reduced, and the security and stability thereof are greatly improved.

At step 200, the receiving card of the data playback device decrypts the media data encryption package to obtain configuration data and media data to be decrypted, configures a programmable logic circuit according to the configuration data, decrypts the encrypted media data based on the configured programmable logic circuit to obtain decrypted media data, and plays the decrypted media data, where the configuration data includes position rearrangement index data and a preset check code.

The data playback terminal includes an LED display screen and a receiving card. In the embodiment, the data playback device transmits the media data encryption package to the receiving card after obtaining the media data encryption package, and the receiving card may perform first layer decryption on the data media encryption package by using a decryption algorithm to obtain configuration data and video data to be decrypted. In a specific implementation, if the media data encryption package is a file, the media data encryption package can be divided into a configuration file and a video file according to a name of the file. If the media data encryption package is a split file including the configuration file and the video file, the media data encryption package may be directly decrypted to obtain the configuration file and the video file to be decrypted. Then, the obtained configuration file is converted into target data that meets requirements of the display control system, and the programmable logic circuit of the receiving card is configured according to the converted target data. Then, an Multi Format Codec (MFC) media decoder is called based on the configured programmable logic circuit to drive the LED display screen to decode and play the video file to be decrypted.

In the above-described method of playing media data, the data encryption device constructs the data arrangement table corresponding to the structure parameters of the display screen of the data playback device based on the structure parameters, performs the data rearrangement operation on the data arrangement table to obtain the position rearrangement index data, performs pixel rearrangement encryption on each image frame of the media data to be encrypted according to the position rearrangement index data to obtain the encrypted media data, merges the encrypted media data, the position rearrangement index data, and the preset check code to obtain the media data encryption package that is almost impossible to be cracked, and transmits the media data encryption package to the data playback device. Since the data transmitted to the receiving card of the data playback device is still the encrypted data that is difficult to be cracked, the data can be effectively prevented from being tampered. The receiving card configures the programmable logic circuit according to configuration data including the position rearrangement index data and the preset check code, so that the configured programmable logic circuit corresponds to the structure parameters of the display screen. Therefore, in the decryption process, the decoding can be performed only depending on a real-time decoding capability of a hardware of the data playback device and a relationship between the programmable logic circuit and the hardware structure of the display screen. According to the above solution, encoding of the software and the real-time decoding capability of the hardware architecture are effectively utilized in combination with the programmable circuit architecture specific to the control system, to ensure that the media data is played correctly.

In an embodiment of the present disclosure, the receiving card of the data playback device configuring the programmable logic circuit according to the configuration data may include: filling position rearrangement index data into corresponding one of buffer areas in the receiving card to configure the programmable logic circuit.

In the present embodiment, the configuration data includes the position rearrangement index data, where the position rearrangement index data represents a mapping relationship between a logical position and a physical position of each of pixels of the display screen. Specifically, the position rearrangement index data may be a position rearrangement index table, and the pixel rearrangement encryption may be performed on the image in the video data according to the position rearrangement index table, or the rearranged image of the video data may be restored to correctly original video data. The receiving card configuring the programmable logic circuit may include: filling the position rearrangement index data into corresponding one of cache areas (i.e., a random access memory (RAM)) in the receiving card. Further, since the RAM has characteristic of data loss due to power outages, in order to initialize the programmable logic circuit of the receiving card correctly, a microcontroller unit (MCU) of the receiving card may check the configuration data, and then transfer the configuration data into a memory of FLASH of the receiving card for backup. In the solution of the present disclosure, since it is necessary to perform an obfuscation operation on the above three mathematical models of the pixel dotting table, the cabinet data arrangement table, and the cabinet connection diagram in the encryption-decryption process, it is not necessary to store relevant information in the receiving card. Even if relevant information is stored in the RAM in the use process, it is necessary to periodically clear the information with a firmware operation. Since the position rearrangement index table supports logical-physical position remapping of the LED display pixels, the purpose of restoring the rearranged image information to the sequential image information can be achieved by creating a look-up table to complete logic implementation of the image information decryption process. Based on the created look-up table, a unique pixel rearrangement index table corresponding to the encoded video data can be generated according to a pixel position table encoding format, and then the pixel rearrangement index table is used to restore the rearranged image information to the sequential image information.

In a specific implementation, the position rearrangement index data decrypted by the data playback device may include: module-level position rearrangement index data, cabinet-level position rearrangement index data and screen-level position rearrangement index data. Three areas for storing the module-level position rearrangement index data, cabinet-level position rearrangement index data, and screen-level position rearrangement index data are preset in the memory of the receiving card of the LED display control system of the LED display screen. The configuration of the programmable logic circuit may include: filling the module-level position rearrangement index data, the cabinet-level position rearrangement index data, and the screen-level position rearrangement index data respectively in the memory of the receiving card of the LED display control system, and then performing initialization of the data to complete configuration of the programmable logic circuit. In the embodiment, the above-described configuration can realize sequential decryption of the encrypted and rearranged video data.

In an embodiment of the present disclosure, the data receiving card decrypting the media data encryption package to obtain the configuration data and the media data to be decrypted may include: decrypting the media data encryption package to obtain the configuration data and the media data to be decrypted when validity check of the media data encryption package has been passed.

In order to prevent the media data encryption package from being intercepted and tampered by an attacker during transmission of the media data, the validity check may be performed on the media data encryption package. If the validity check is passed, the integrity and correctness of the data of the media data encryption package are verified, and the media data encryption package is not tampered. In this case, decryption of the media data encryption package is started. In the embodiment, the validity check is performed before decrypting the media data encryption package, so that correct and secure playing of the media data can be further ensured. In the embodiment, the media data encryption package may carry a preset first MD5 check code. After the media data encryption package is obtained, an MD5 operation may be performed on the media data encryption package to obtain a second MD5 check code. Then, the preset first MD5 check code is compared with the second MD5 check code to determine whether the preset first MD5 check code matches the second MD5 check code. If the first MD5 check code matches the second MD5 check code, it indicates that the media data encryption package has not been tampered. Otherwise, it indicates that the media data encryption package has been tampered. In the present embodiment, the validity check of the media data encryption package can be easily and efficiently performed in a manner of matching the check codes.

For a clearer description of the method of playing media data provided in the present disclosure, following description is made in connection with a specific embodiment.

A worker intends to transmit a piece of video data to be played to a data playback device, where the data playback device is mounted with an LED screen with a horizontal length of 4 m*a height of 3 m in which the 96*96 cabinets composed of the 32*32 lattice modules. The worker imports video data to be encrypted and structure parameters of an LED display screen of the video data playback device, including a 32*32 lattice module, a 3*3 lattice cabinet, and a 4*3 lattice screen, in the data encryption device, and then transmits a data encryption instruction. A processor of the data encryption device responds to the data encryption instruction, correspondingly constructs a 32*32 module model (32*32 matrix), a 3*3 cabinet model (4*3 matrix) and a 4*3 screen model (4*3 matrix) according to the 32*32 lattice module, the 3*3 lattice cabinet, and the 4*3 lattice screen, and then performs a rearrangement operation on the 32*32 module model, the 3*3 cabinet model and the 4*3 screen model according to the shuffling algorithm to obtain a rearranged module model, a rearranged cabinet model, and a rearranged screen model, and then analyzes the rearranged module model, the rearranged cabinet model and the rearranged screen model as well as an un-rearranged module model, an un-rearranged cabinet model, and an un-rearranged screen model, to obtain a module-level position rearrangement index table, a cabinet-level position rearrangement index table, and a screen-level position rearrangement index table. Then, frame-by-frame rearrangement encryption processing may be: cutting each image frame in the video data sequentially (from top to bottom and/or from left to right) into image blocks with a size of 32*32 points by using the 32*32 module-level position rearrangement index table to obtain a plurality of image blocks; then performing a pixel rearrangement operation on each of the image blocks to generate new rearranged image blocks, obtain module-level pixel rearrangement encryption results, and further encrypt and store the module-level position rearrangement index table; then performing arrangement combination on the module-level pixel rearrangement encryption results according to 3*3 cabinet-level position rearrangement index data to obtain cabinet-level pixel rearrangement encryption results, and similarly encrypt and store the cabinet-level position rearrangement index table; and finally, performing arrangement combination on the cabinet-level pixel rearrangement encryption results according to the 4*3 screen-level position rearrangement index table to obtain screen-level pixel rearrangement encryption result, and similarly, encrypt and store the screen-level position rearrangement index table, so that an encryption result obtained by single-image frame processing is encrypted and stored. According to the above processing, the encryption processing of the entire video data is completed frame by frame, the screen-level pixel rearrangement encryption results corresponding to each image frame are collected to obtain the encrypted video data, and then the encryption results are stored as a data file. Further, an MD5 operation may be performed on the encrypted video data to generate a first MD5 check code, and then the module-level position rearrangement index data, the cabinet-level position rearrangement index data, and the screen-level position rearrangement index data, the encrypted video data, and the first MD5 check code are packed together to obtain a media data encryption package. The media data encryption package may be transmitted to the data playback device over a content distribution network or a file transfer protocol.

After receiving the media data encryption package, the receiving card of the data playback device can first perform an MD5 operation on the media data encryption package to obtain a second MD5 check code, and then compare the first MD5 check code with the second MD5 check code to determine whether the first MD5 check code matches the second MD5 check code. If the first MD5 check code matches the second MD5 check code, it indicates that the media data encryption package has not been tampered. The receiving card may perform first layer decryption on the data media encryption package by using a decryption algorithm to obtain position rearrangement index data (including module-level position rearrangement index data, cabinet-level position rearrangement index data, and screen-level position rearrangement index data) and media data to be decrypted, fill the module-level position rearrangement index data, the cabinet-level position rearrangement index data, and the screen-level position rearrangement index data into corresponding ones of areas in the memory of RAM of the receiving card respectively, and then initializes the data to complete configuration of the programmable logic circuit. Finally, the MFC media decoder is called based on the configured programmable logic circuit to decode and play the video data having the rearranged pixels.

It should be understood that, although the steps in the flow charts given in FIGS. 2, 4, and 6 are shown in sequence as indicated by arrows, these steps are not necessarily performed in sequence as indicated by the arrows. Unless expressly stated herein, the execution of the steps herein is not limited in strict order, and the steps may be executed in other orders. Further, at least a portion of the steps in FIGS. 2, 4 and 5 may include a plurality of sub-steps or a plurality of stages, which are not necessarily performed at the same time, but may be performed at different moments. The sub-steps or stages are not necessarily performed sequentially, but may be performed in turn or alternately with at least a portion of other steps, or the sub-steps or stages of other steps.

It should be understood by those of ordinary skill in the art that all or a portion of the flows of implementing the methods of the embodiments described above may be accomplished by computer instructions instructing relevant hardware that may be stored in a non-volatile computer-readable storage medium that, when executed, may include the flows of the method embodiments described above.

Figure 7:
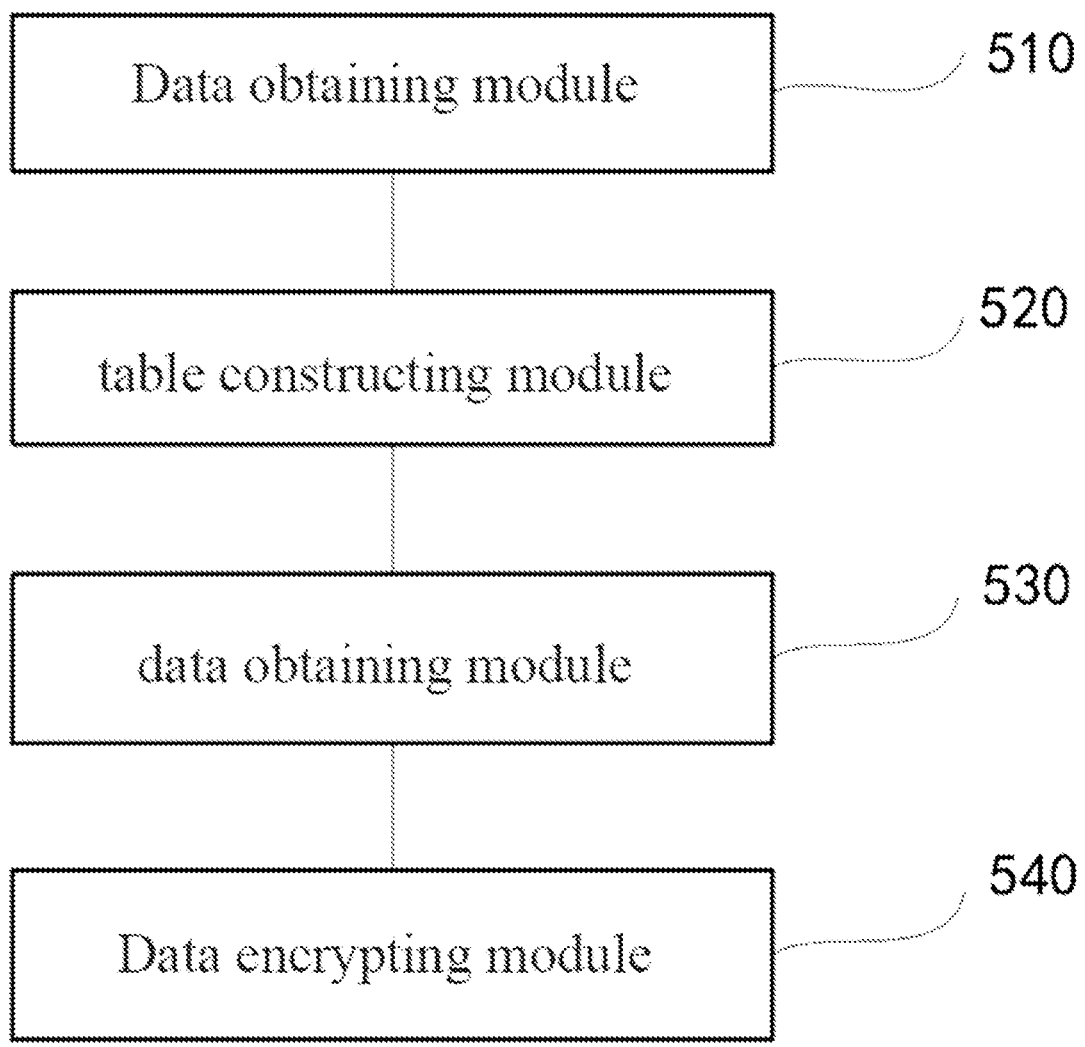
FIG. 7 is a block diagram of an apparatus for encrypting media data according to some embodiments of the present disclosure.

As shown in FIG. 7, there is provided a media data encryption apparatus, including: a data obtaining module 510, a data arrangement table constructing module 520, an index data obtaining module 530, and a data encrypting module 540.

The data obtaining module 510 is configured to obtain media data to be encrypted and one or more structure parameters of a display screen of a target playing terminal.

The data arrangement table constructing module 510 is configured to construct a data arrangement table corresponding to the structure parameters, where the position rearrangement index data represents a mapping relationship between a logical position and a physical position of each of pixels of a display screen.

The index data obtaining module 530 is configured to perform a data rearrangement operation on the data arrangement table to obtain position rearrangement index data, where the position rearrangement index data represents a mapping relationship between a logical position and a physical position of each of display pixels.

The data encrypting module 540 is configured to perform pixel rearrangement encryption on the media data to be encrypted according to the position rearrangement index data to obtain a media data encryption package.

In the above-described apparatus for encrypting media data, the data arrangement table associated with the one or more structure parameters of the display screen of the target playing terminal is first constructed, the data rearrangement operation is then performed on the data arrangement table to obtain position rearrangement index data, and finally, the pixel rearrangement encryption operation is performed on the media data to be encrypted according to the position rearrangement index data, so that there are many possibilities for the obtained encryption result. Since the position rearrangement index data represents a mapping relationship between a logical position and a physical position of each of pixels of the display screen, it is necessary to perform inverse rearrangement decoding to correctly decode and play the media data depending on real-time decoding capability of the receiving card of the target playing terminal. As such, even if an operating system of the target playing terminal is illegally controlled, since there are many possibilities for the obtained encryption result, the possibility of cracking the media data encryption package is minimal. Therefore, the inverse rearrangement decoding cannot be performed correctly, so that the media data cannot be displayed correctly, thereby improving the information security of the media data.

In an embodiment of the present disclosure, the position rearrangement index data includes module-level position rearrangement index data, and the data encrypting module 540 is further configured to: divide each image frame of the media data to be encrypted into image blocks that each has a size proportional to the module lattice scale of the display screen, perform a pixel rearrangement operation on each of the image blocks according to the module-level position rearrangement index data to obtain module-level pixel rearrangement encryption results, and collect the module-level pixel rearrangement encryption results corresponding to each image frame of the media data to be encrypted to obtain the encrypted media data.

In an embodiment of the present disclosure, the position rearrangement index data further includes cabinet-level position rearrangement index data, and the data encrypting module 540 is further configured to: perform pixel arrangement combination on the module-level pixel rearrangement encryption result according to the cabinet-level position rearrangement index data to obtain cabinet-level pixel rearrangement encryption results, and collect the cabinet-level pixel rearrangement encryption results corresponding to each image frame in the media data to be encrypted to obtain the encrypted media data.

In an embodiment of the present disclosure, the position rearrangement index data further include: screen-level position rearrangement index data.

The data encrypting module 540 is further configured to: perform pixel arrangement combination on the cabinet-level pixel rearrangement encryption result according to the screen-level position rearrangement index data to obtain screen-level pixel rearrangement encryption results, and collect the screen-level pixel rearrangement encryption results corresponding to each image frame in the media data to be encrypted to obtain the encrypted media data.

In an embodiment of the present disclosure, the data arrangement table includes a module data arrangement table, a cabinet data arrangement table, and a screen data arrangement table. The index data obtaining module 530 is further configured to: perform data rearrangement operations on the module data arrangement table, the cabinet data arrangement table, and the screen data arrangement table, respectively, to obtain module-level position rearrangement index data, cabinet-level position rearrangement index data, and screen-level position rearrangement index data.

In an embodiment of the present disclosure, the index data obtaining module 530 is further configured to: perform data rearrangement operations on the module data arrangement table, the cabinet data arrangement table, and the screen data arrangement table, respectively, according to a shuffling algorithm.

In an embodiment of the present disclosure, the index data obtaining module 530 is further configured to: perform data rearrangement operations on the module data arrangement table, the cabinet data arrangement table, and the screen data arrangement table, respectively, according to a random extraction algorithm.

In an embodiment of the present disclosure, the structure parameters of the display screen include a module lattice scale, a cabinet lattice scale, and a screen lattice scale. The data arrangement table constructing module 520 is further configured to construct a module data arrangement table corresponding to a module lattice scale according to the module lattice scale, a cabinet data arrangement table corresponding to a cabinet lattice scale according to the cabinet lattice scale, and a screen data arrangement table corresponding to a screen lattice scale according to the screen lattice scale.

A specific definition for the apparatus for encrypting media data may refer to the above definition of the method of encrypting media data, which is not repeatedly described herein. Various modules in the above-described apparatus for encrypting media data may be implemented in whole or in part by a software, a hardware, and combinations thereof. The modules may be embedded in a processor of a computer device or independent of the processor of the computer device in the form of a hardware, or may be stored in a memory of the computer device in the form of a software to facilitate the processor to call the modules to perform operations corresponding to the modules.

Figure 8:
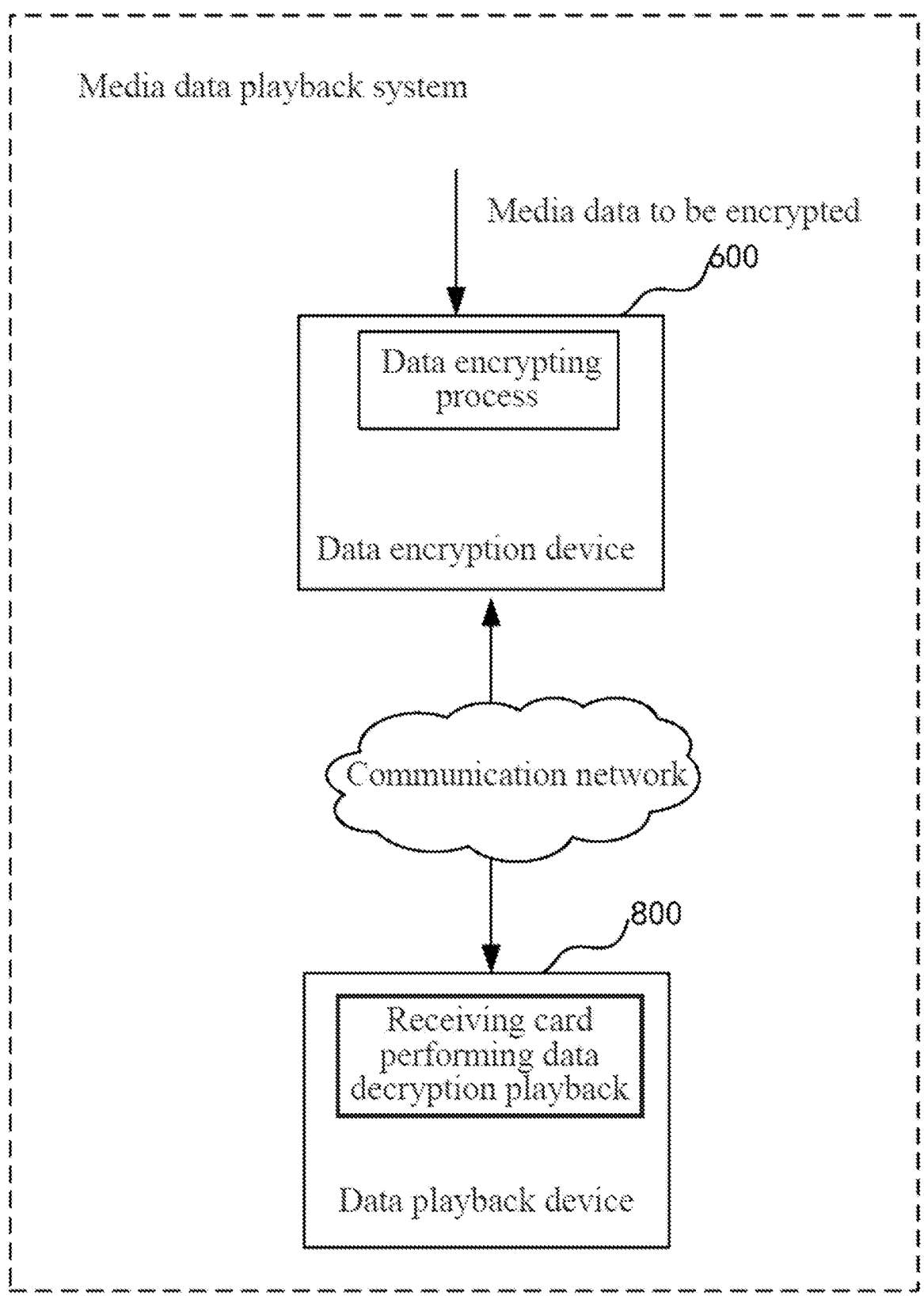
FIG. 8 is a block diagram of a system for playing media data according to some embodiments of the present disclosure.

As shown in FIG. 8, in an embodiment of the present disclosure, a system for playing media data is provided, including: a data encryption device 600 and a data playback device 800.

The data encryption device 600 encodes and encrypts media data to be encrypted with the method of encrypting the media data described above to obtain the encrypted media data, merges the encrypted media data, position rearrangement index data, and a preset check code to obtain a media data encryption package, and transmits the media data encryption package to the data playback device 800.

A receiving card of the data playback device 800 decrypts the media data encryption package to obtain configuration data and media data to be decrypted, configures a programmable logic circuit according to the configuration data, and decrypts and plays the media data to be decrypted based on the configured programmable logic circuit.

The configuration data includes the position rearrangement index data and the preset check code.

In the above-described system for playing media data, the data encryption device constructs the data arrangement table corresponding to the structure parameters of the display screen of the data playback device based on the structure parameters, performs the data rearrangement operation on the data arrangement table to obtain the position rearrangement index data, performs pixel rearrangement encryption on each image frame of the media data to be encrypted according to the position rearrangement index data to obtain the encrypted media data, merges the encrypted media data, the position rearrangement index data, and the preset check code to obtain the media data encryption package that is almost impossible to be cracked, and transmits the media data encryption package to the data playback device. Since the data transmitted to the receiving card of the data playback device is still the encrypted data that is difficult to be cracked, the data can be effectively prevented from being tampered. The receiving card configures the programmable logic circuit according to configuration data including the position rearrangement index data and the preset check code, so that the configured programmable logic circuit corresponds to the structure parameters of the display screen. Therefore, in the decryption process, the decoding can be performed only depending on a real-time decoding capability of a hardware of the data playback device and a relationship between the programmable logic circuit and the hardware structure of the display screen. According to the above solution, encoding of the software and the real-time decoding capability of the hardware architecture are effectively utilized in combination with the programmable circuit architecture specific to the control system, to ensure that the media data is played correctly.

In an embodiment of the present disclosure, the data playback device 800 is further configured to: fill position rearrangement index data into corresponding one of buffer areas in the receiving card to configure the programmable logic circuit.

In an embodiment of the present disclosure, the data playback device 800 is further configured to: decrypt the media data encryption package to obtain the configuration data and the media data to be decrypted when validity check of the media data encryption package has been passed.

In an embodiment of the present disclosure, the data playback device 800 is further configured to: perform a hash operation on the media data encryption package, generate a check code, and determine whether the check code matches a preset check code to perform a validity check on the media data encryption package.

Figure 9:
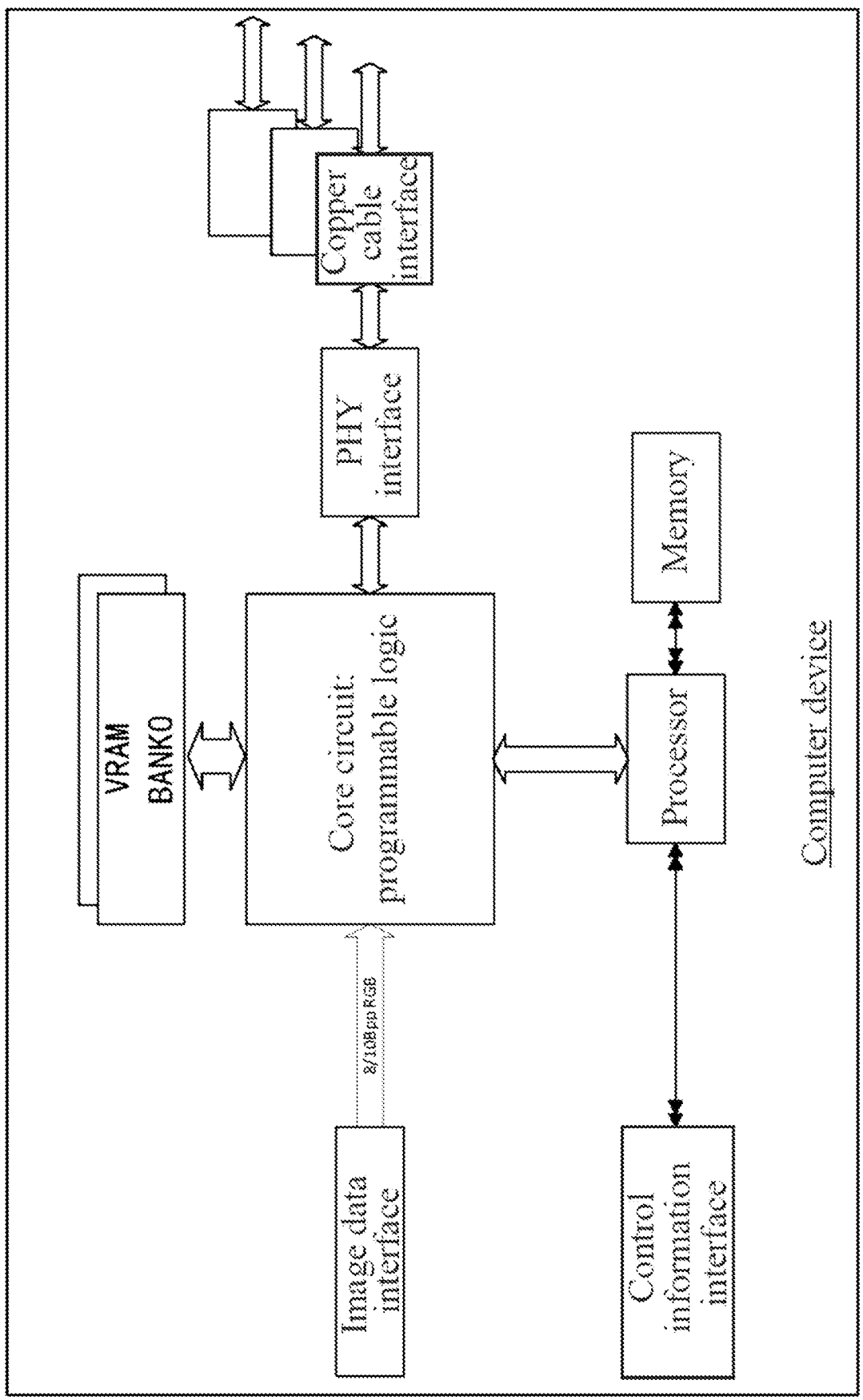
FIG. 9 is a block diagram of a computer device according to some embodiments of the present disclosure.

In an embodiment of the present disclosure, a computer device is provided, which may be a data encryption device in an LED display control system, where an internal structure of the computer device may be shown in FIG. 9. The computer device includes a programmable core circuit, a processor, a memory, a Video Random Access Memory (VRAM), a physical layer (PHY) interface, a copper cable interface, an image data interface, a control information interface, and the like connected through a system bus. The processor may be a microprocessor, and the image data interface may be a video/graphics interface. The processor of the computer device is configured to provide computing and control capabilities, including, but not limited to, an ARM microprocessor. The memory of the computer device includes a non-volatile storage medium, which may be a FLASH memory, and an internal memory. The non-volatile storage medium may store computer instructions and the like. The internal memory provides an environment for the operation of the computer instructions in the non-volatile storage medium. The PHY interface of the computer device is configured to be in communication with an external terminal through a network connection. The computer instructions, when executed by the processor, implement a method of encrypting media data.

It should be understood by those skilled in the art that the structure shown in FIG. 8 is merely a block diagram of a portion of the structure associated with the solution of the present disclosure and does not constitute a definition of the computer device to which the solution of the present disclosure is applied. A particular computer device may include more or fewer components than shown, or some combination of components, or have different arrangements of components.

A computer device includes: a memory and one or more processors, where the memory has stored therein computer instructions that, when executed by the processors, cause the one or more processors to perform operations of any one of the above methods for encrypting media data.

One or more computer storage medium have stored computer instructions thereon that, when executed by one or more processors, cause the one or more processors to perform operations of any one of the above methods for encrypting media data.

Any combination of the technical features in the foregoing embodiments may be performed. For brevity of description, all possible combinations of the technical features in the foregoing embodiments are not described. However, as long as there is no contradiction among the combination of the technical features, it should be considered as the scope described in this specification.

Some embodiments of the present disclosure have been described in detail above. Many modifications or equivalent substitutions with respect to the embodiments may be contemplated by those skilled in the art without departing from the spirit and scope of the present disclosure, and thus shall fall within the scope of the present disclosure. Accordingly, the scope of the present disclosure should be defined by the appended claims.

What is claimed is:

1. A method of encrypting media data, comprising: obtaining the media data and one or more structure parameters of a display screen of a data playback device;
constructing a data arrangement table based on the structure parameters; performing a data rearrangement operation on the data arrangement table to obtain position rearrangement index data, wherein the position rearrangement index data represents a mapping relationship between a logical position of each of pixels of the display screen and a physical position of the each of pixels; performing pixel rearrangement encryption on each of one or more image frames of the media data based on the position rearrangement index data, to obtain encrypted media data; and wherein the structure parameters indicate that the display screen comprises a plurality of display modules each comprising ones of the pixels defining a module lattice scale; the position rearrangement index data comprises module-level position rearrangement index data for each of the display modules; and the performing of the pixel rearrangement encryption on each of the image frames comprises:
dividing the each of the image frames into image blocks each having a size proportional to the module lattice scale and corresponding to one of the display modules;
obtaining module-level pixel rearrangement encryption results respectively for the image blocks by:
performing a pixel rearrangement operation on each of the image blocks, based on the module-level position rearrangement index data, to obtain one of module-level pixel rearrangement encryption results for the each of the image blocks; and collecting module-level pixel rearrangement encryption results to obtain a part of the encrypted media data corresponding to the each of the image frames.

2. The method of claim 1, wherein the structure parameters further indicate that the display screen comprises a plurality of cabinets each comprising ones of the display modules arranged in an array;
the position rearrangement index data further comprises cabinet-level position rearrangement index data for each of the cabinets; and
the collecting of the module-level pixel rearrangement encryption results comprises:
obtaining cabinet-level pixel rearrangement encryption results respectively for the cabinets by: for each of the cabinets, performing a module rearrangement operation on ones of the module-level pixel rearrangement encryption results corresponding to the each of the cabinets, based on the cabinet-level position rearrangement index data, to obtain one of cabinet-level pixel rearrangement encryption results; and
collecting box-level pixel rearrangement encryption results to obtain a part of the encrypted media data corresponding to the each of the image frames.

3. The method of claim 2, wherein the position rearrangement index data further comprises screen-level position rearrangement index data;
the collecting of the cabinet-level pixel rearrangement encryption results comprises:
performing a cabinet rearrangement operation on the cabinet-level pixel rearrangement encryption results, based on the screen-level position rearrangement index data, to obtain one of screen-level pixel rearrangement encryption results; and
collecting screen-level pixel rearrangement encryption results to obtain a part of the encrypted media data corresponding to the each of the image frames.

4. The method of claim 1, wherein the data arrangement table comprises a module data arrangement table, a cabinet data arrangement table, and a screen data arrangement table; and
the performing of the data rearrangement operation on the data arrangement table comprises:
performing the data rearrangement operation on each of the module data arrangement table, the cabinet data arrangement table and the screen data arrangement table, to obtain module-level position rearrangement index data, cabinet-level position rearrangement index data, and screen-level position rearrangement index data.

5. The method of claim 4, wherein the performing of the data rearrangement operation on each of the module data arrangement table, the cabinet data arrangement table, and the screen data arrangement table comprises:
performing the data rearrangement operation on each of the module data arrangement table, the cabinet data arrangement table, and the screen data arrangement table based on a shuffling algorithm.

6. The method of claim 1, wherein the structure parameters comprise a module lattice scale, a cabinet lattice scale and a screen lattice scale of the display screen; and
the constructing of the data arrangement table based on the structure parameters comprises:
constructing a module data arrangement table corresponding to the module lattice scale based on the module lattice scale;
constructing a cabinet data arrangement table corresponding to the cabinet lattice scale based on the cabinet lattice scale; and
constructing a screen data arrangement table corresponding to the screen lattice scale based on the screen lattice scale.

7. The method of claim 1, wherein the data arrangement table comprises at least one of: a table indicating a logical relationship between each of the pixels and a driving circuit, a table indicating a relative relationship between each of display modules of the display screen and output data from a receiving card, or a table indicating a connection relationship between each of cabinets of the display screen and a display unit.

8. A system for playing media data, comprising: a data encryption device and a data playback device communicating with each other over a network;
wherein the data encryption device is configured to encrypt the media data by the method of claim 1 to obtain the encrypted media data; merge the encrypted media data, the position rearrangement index data and a preset check code to obtain a media data encryption package; and transmit the media data encryption package to the data playback device; and
the data playback device comprises a receiving card configured to: decrypt the media data encryption package to obtain configuration data and the encrypted media data, configure a programmable logic circuit based on the configuration data, and decrypt the encrypted media data based on the configured programmable logic circuit to obtain decrypted media data; and play the decrypted media data; and
wherein the configuration data comprises the position rearrangement index data and the preset check code.

9. The system of claim 8, wherein the receiving card is further configured to configure the programmable logic circuit by filling the position rearrangement index data into a buffer area in the receiving card.

10. The system of claim 8, wherein the receiving card is further configured to perform validity check on the media data encryption package and, in response to determining that the media data encryption package has passed validity check, decrypt the media data encryption package.

11. The system of claim 8, wherein the receiving card is further configured to: perform a hash operation on the media data encryption packet to generate a check code; and perform the validity check on the media data encryption packet by determining whether the check code matches the preset check code.

12. A computer device, comprising: one or more processors; and a memory storing computer instructions that, when executed by the one or more processors, cause the one or more processors to perform operations comprising: obtaining the media data and one or more structure parameters of a display screen of a data playback device;
constructing a data arrangement table based on the structure parameters; performing a data rearrangement operation on the data arrangement table to obtain position rearrangement index data, wherein the position rearrangement index data represents a mapping relationship between a logical position of each of pixels of the display screen and a physical position of the each of pixels; performing pixel rearrangement encryption on each of one or more image frames of the media data based on the position rearrangement index data, to obtain encrypted media data; and wherein the structure parameters indicate that the display screen comprises a plurality of cabinets, each of the cabinets comprising a plurality of display modules arranged in an array, each of the display modules comprising ones of the pixels defining a module lattice scale; the position rearrangement index data comprises: module-level position rearrangement index data for each of the display modules, cabinet-level position rearrangement index data for each of the cabinets, and screen-level position rearrangement index data; and the performing of the pixel rearrangement encryption on each of the image frames based on the position rearrangement index data to obtain the encrypted media data comprises: obtaining screen-level pixel rearrangement encryption results respectively for the image frames by: for each of the image frames, dividing the each of the image frames into image blocks each having a size proportional to the module lattice scale and corresponding to one of the display modules;

obtaining module-level pixel rearrangement encryption results respectively for the image blocks by performing a pixel rearrangement operation on each of the image blocks, based on the module-level position rearrangement index data, to obtain one of the module-level pixel rearrangement encryption results for the each of the image blocks; obtain cabinet-level pixel rearrangement encryption results respectively for the cabinets by: for each of the cabinets, performing a module rearrangement operation on one of the module-level pixel rearrangement encryption results corresponding to the each of the cabinets, based on the cabinet-level position rearrangement index data, to obtain one of the cabinet-level pixel rearrangement encryption results; and performing a cabinet rearrangement operation on the cabinet-level pixel rearrangement encryption results, based on the screen-level position rearrangement index data, to obtain one of the screen-level pixel rearrangement encryption results; and collecting the screen-level pixel rearrangement encryption results to obtain the encrypted media data.

* * * * *